United States Patent [19]

Chevrier et al.

[11] Patent Number: 4,503,617

[45] Date of Patent: Mar. 12, 1985

[54] AUTOMATIC GAGE MEASURING MACHINE

[76] Inventors: René R. Chevrier, 13, les Prés de l'Eglise, Pompignac 33730 Tresses; Bernard B. Schatz, 11, rue des Mimosas, 91470 Limours, both of France

[21] Appl. No.: 474,476

[22] Filed: Mar. 11, 1983

[30] Foreign Application Priority Data

Jan. 24, 1983 [FR] France .................................. 83 45002

[51] Int. Cl.³ .............................................. G01B 7/28
[52] U.S. Cl. .................................................. 33/174 L
[58] Field of Search ............. 33/174 L, 143 L, 174 R, 33/148 H, 149 J

[56] References Cited

U.S. PATENT DOCUMENTS

| | | | |
|---|---|---|---|
| 3,076,268 | 2/1963 | Fry et al. | 33/143 L |
| 3,416,658 | 12/1968 | Goller et al. | 33/143 L |
| 4,135,306 | 1/1979 | Hannon | 33/174 L |
| 4,347,667 | 9/1982 | Albertazzi | 33/174 L |
| 4,393,717 | 7/1983 | Mason et al. | 33/174 L |
| 4,402,139 | 9/1983 | Noyes | 33/174 L |

Primary Examiner—Willis Little

[57] ABSTRACT

An automatic gage measuring machine comprises a carrousel ring for storing and delivering standard gages and gages to be tested and comprising a flat circular ring mounted for rotation about a vertical axis. The carrousel ring is driven intermittently. The gages are measured by at a measuring station including two sensing members having probes movable along a vertical axis for contact with opposed sides of a gage. A pair of gages are transferred from the carrousel ring to the measuring axis on a gage support plate by first and second carriages mounted for movement in mutually perpendicular directions. A microprocessor synchronizes and controls movements of the various moving parts, controls the sensing members and stores the measurements.

9 Claims, 6 Drawing Figures

AUTOMATIC GAGE MEASURING MACHINE

BACKGROUND OF THE INVENTION

The present invention relates to a machine for measuring so-called master gages entirely automatically and more particularly to the measurement by comparison of the thickness of master gages with a standard gage.

Such master gages are used in various measuring devices and therefore must be checked periodically against a standard gage of nominal length and measured beforehand by an interferential method to an accuracy of by 0.02–0.04 μm. The checking of such gauges is customarily carried out with a measuring device having two fingers in contact with the measuring faces of the gage to be tested. The operation of the measuring device and the positioning and removal of the gages are effected by hand which is time consuming and requires the presence of an operator throughout testing.

SUMMARY OF THE INVENTION

An object of the invention is to provide a machine adapted to carry out all the operations without any human intervention other than loading a series of gages to be tested, starting the measuring machine and removing the gages after testing.

According to the invention there is provided an automatic gage measuring machine comprising carrousel means for storing and delivering standard gages and gages to be tested and comprising a flat circular ring mounted for rotational movement on a support frame about a vertical axis. Means intermittently drive the carrousel ring about the vertical axis. A measuring station is located inside the carrousel ring and comprises means for measuring the thickness of the gages comprising two opposed sensing members having probes disposed on the respective sides of the generally plane of the carrousel ring and defining a measuring axis. Probe displacement means effect relative vertical displacement of the probes into contact with opposed sides of a gage in position along the measuring axis. Transfer means transfer flatwise at least one pair of gages consisting of one standard gage and one gage to be tested by horizontal translation substantially in the plane of the carrousel ring from the latter to the measuring station and back to the carrousel ring after the measuring the pair of gages. Positioning means effect horizontal translation of the pair of gages in the general plane of the carrousel ring to the measuring axis. Means record measurements taken by the measuring means. Means control and synchronize movements of the carrousel means, the transfer means, the positioning means and the probe displacement means for sequential measurement of all of the gages to be tested on the carrousel ring.

These and other features and advantages of the invention will become apparent in the description which follows given by way of example of the automatic gage measuring machine with reference to the accompanying drawing.

DETAILED DESCRIPTION OF THE PREFERRED EMBODIMENT

Figure 1:
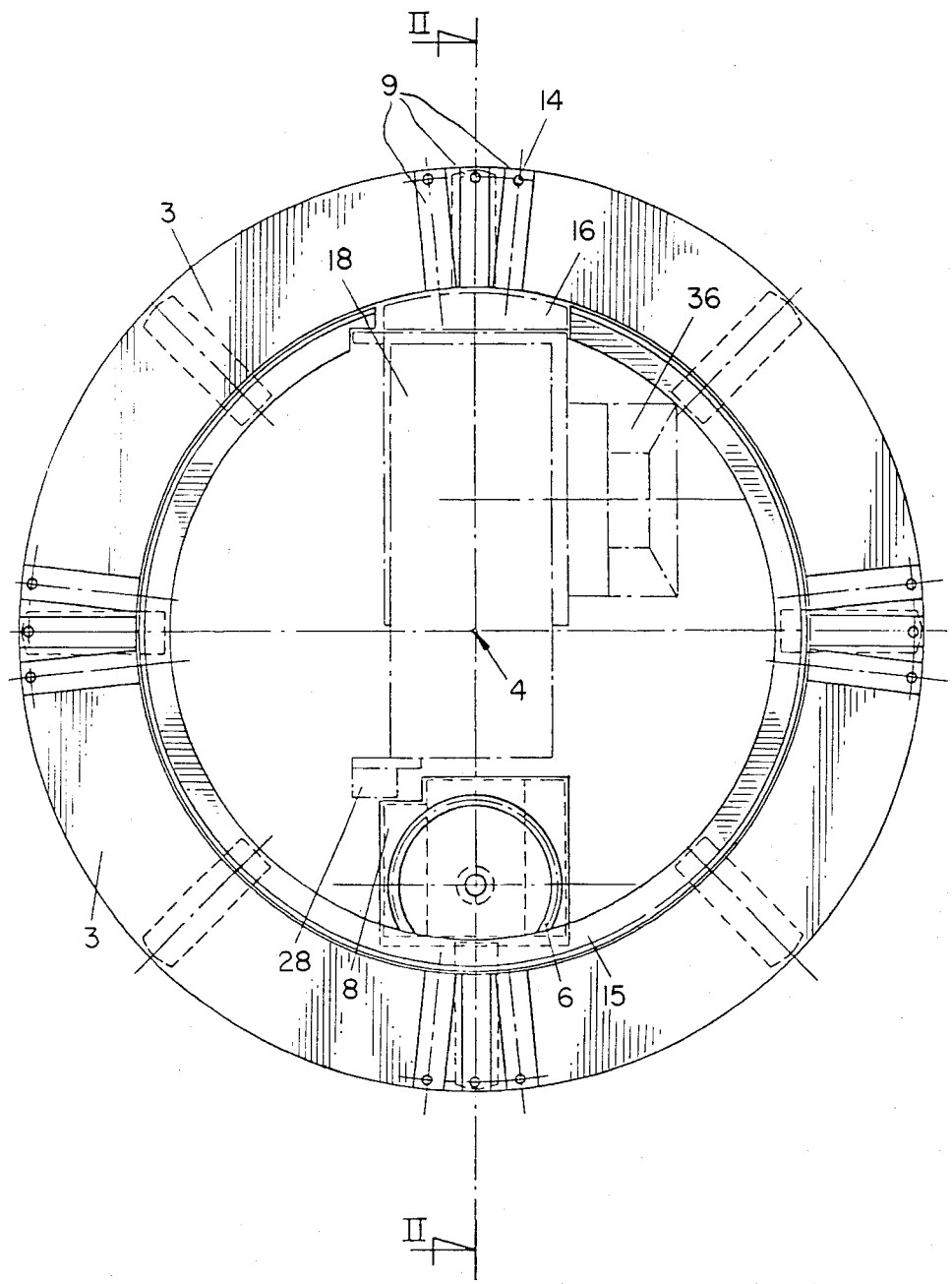
FIG. 1 shows a schematic top plan view of an automatic gage measuring machine embodying the invention.

The automatic gage measuring machine illustrated in the drawings comprises a support frame B comprising a massive granite bed 1 mounted on legs (not shown). The bed 1 has an annular base 2 which supports a carrousel comprising a flat circular ring 3 mounted for movement about a vertical axis 4. The carrousel ring 3 bears on the annular race of an antifriction bearing designated generally by reference 5 and is driven for rotation by a pinion 6 meshing with an internal ring gear 7 carried by the carrousel ring 3. The pinion 6 is driven by an indexing motor system 8 mounted on the bed 1.

Figure 2:
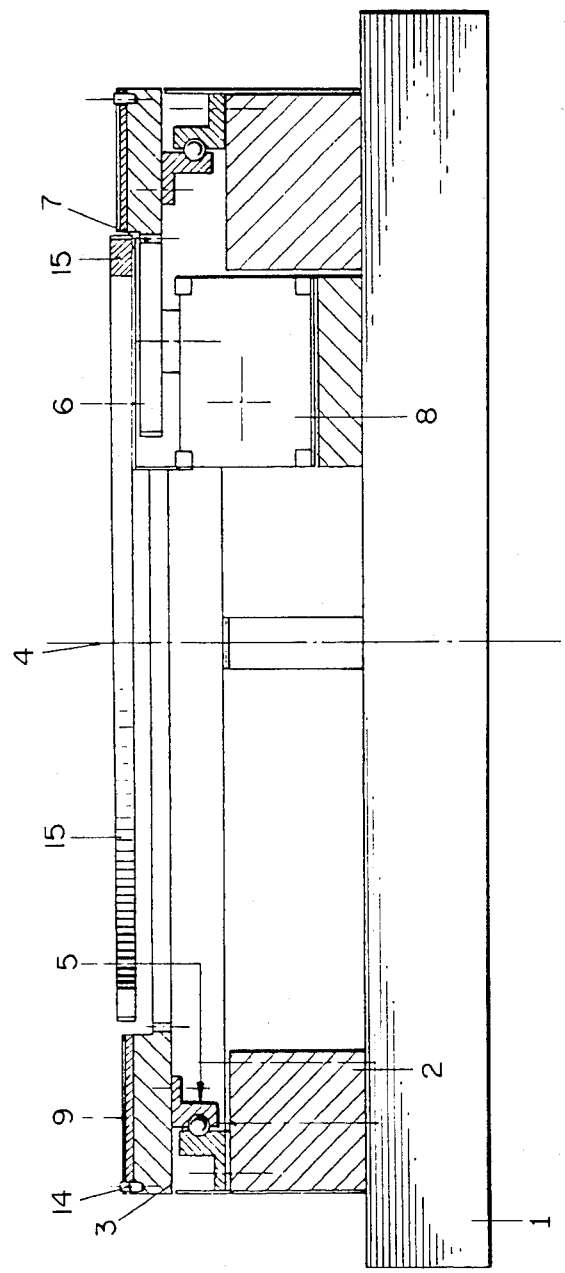
FIG. 2 shows a vertical sectional view taken along line II—II in FIG. 1.
Figure 3:
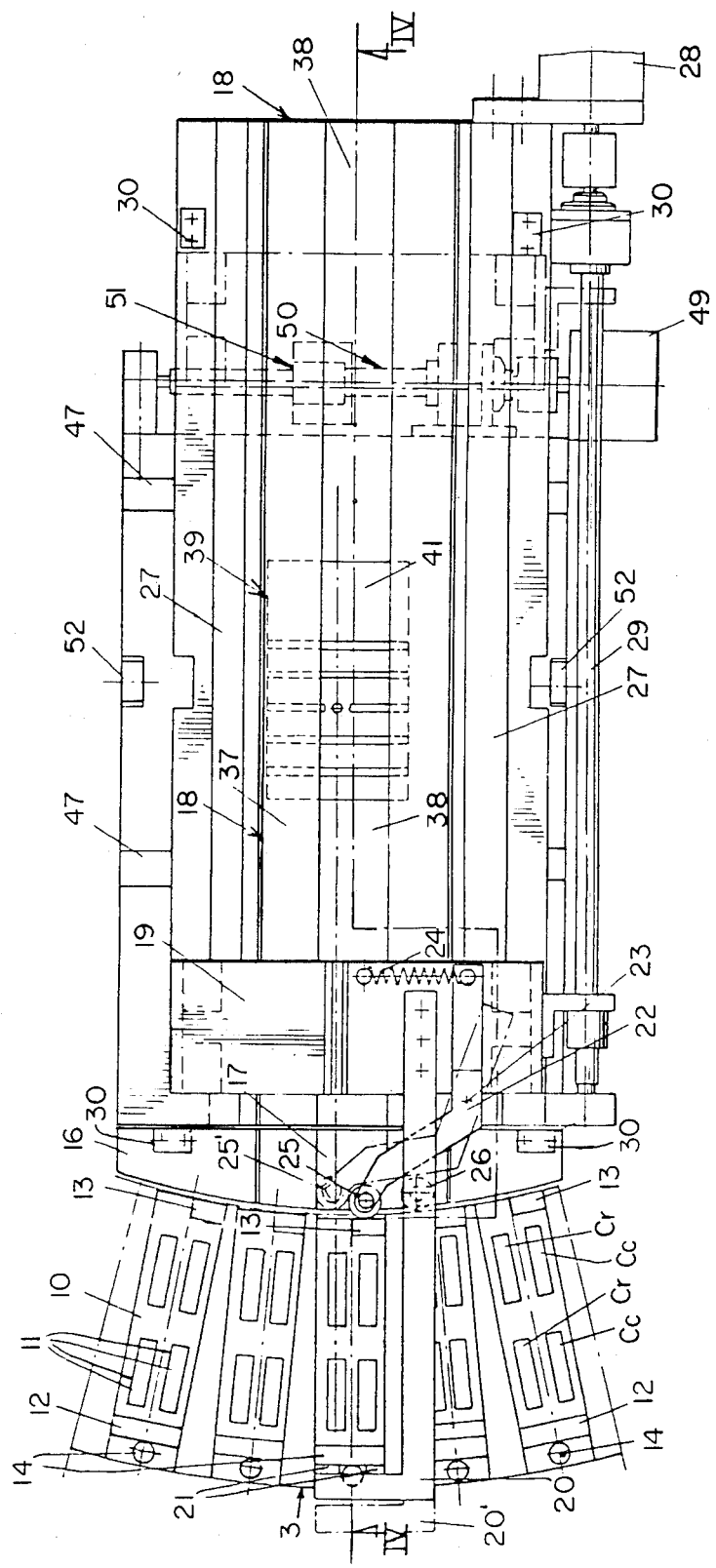
FIG. 3 shows an enlarged and more detailed top plan view of part of the machine as shown in FIG. 1.

The carrousel ring 3 comprises on its flat upper face a series of identical radial slots 9 (FIGS. 1 and 2) with parallel sides, each adapted to received a gage support plate or holder 10 (FIG. 3).

In the illustrated embodiment the gage support plates 10 have four rectangular apertures or housing 11 for accommodating four gages. The housings 11 are arranged in two side-by-side pairs, one housing of each pair receiving a standard gage $C_R$ and the other housing of each pair receiving a so-called master gage to be tested $C_C$.

Each support plate 10 comprises at its end facing outwardly of the machine a shoulder or ledge 12 and at its opposite or inwardly facing end a shoulder or ledge 13 extending across half the width of the support plate 10. The function of these two shoulders 12 and 13 will be described below.

The support plates 10 are positioned correctly in their slots 9 by an abutment lug 14 proximate to the outer periphery of the carrousel ring 3.

A circular guide 15 fixed to the bed 1 is disposed along the inner periphery of the carrousel ring 3 and acts as an abutment for the support plate 10. The guide 15 is notched (FIG. 1) along a predetermined arc in line with the means for transferring the support plate 10 from the carrousel ring 3 to the center of the machine. The notch is occupied by a fixed segment or sill 16 having a radial slot 17 with parallel sides, the depth and width thereof corresponding to the depth and width of the support plates 10.

The fixed segment or sill 16 is level with a first carriage 18 mounted for movement perpendicular to the axis of the slot 17 and carrying another or second carriage 19 mounted for movement perpendicular to the direction of displacement of the first carriage 18, i.e., parallel to the slot 17.

Carriage 19 carries the means for transferring the support plates 10 from the carrousel 3 to carriage 18 and vice versa. The means for transferring support plates comprise an arched push arm 20 having two fingers 21 at its end at the level of the shoulder 1,2 of the support plate 10.

The second carriage 19 also carries a rocker arm 22 pivotally mounted about a pivot 23 and biased by a spring 24. The end of the rocker arm 22 comprises an idle roller or follower 25 adapted to cooperate with the shoulder 13 of the support plates 10. The rocker arm 22 is controlled by roller 26 fixed to the segment 16 (not shown in FIG. 4).

Figure 4:
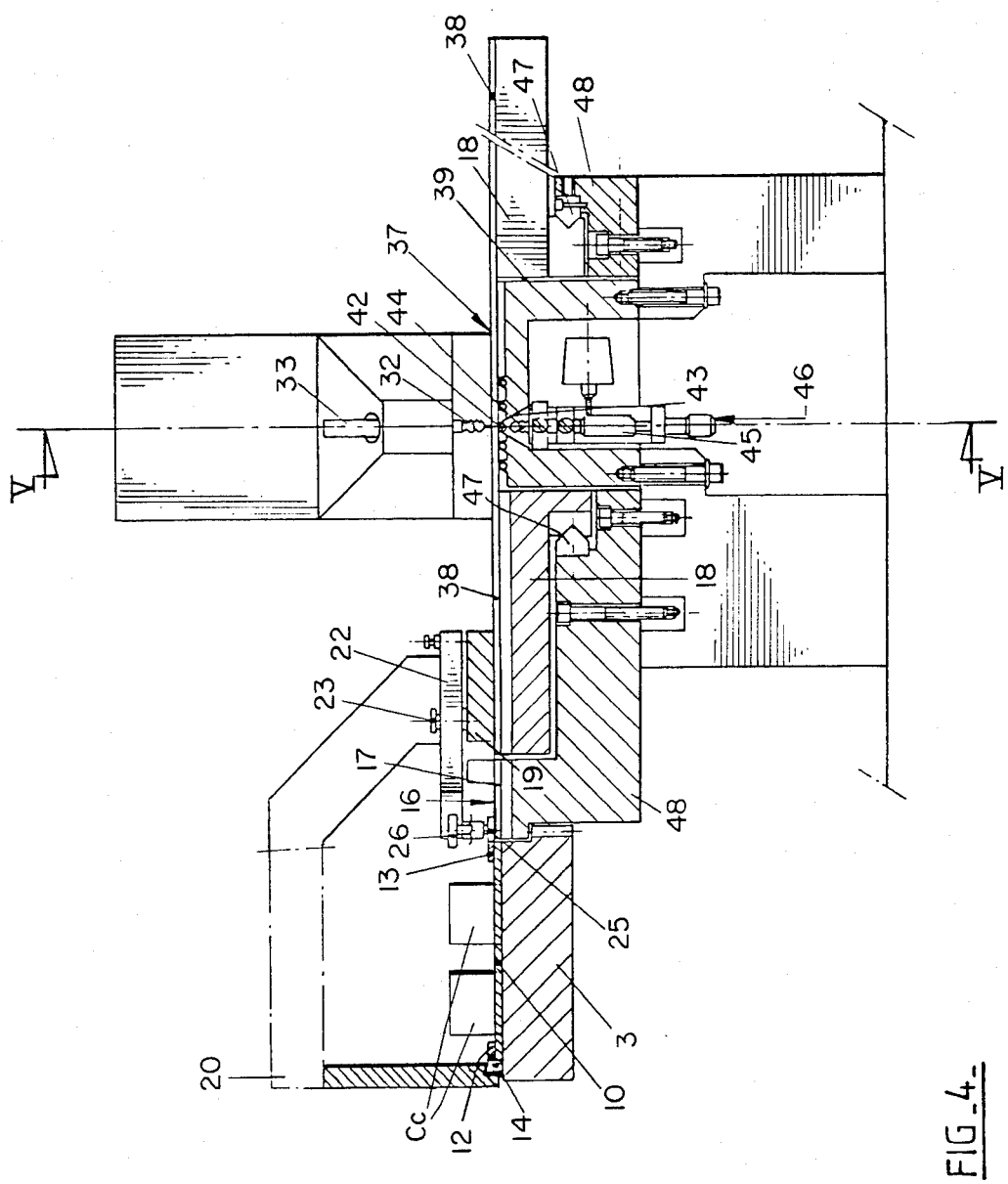
FIG. 4 shows a vertical sectional view taken along line IV—IV in FIG. 1.
Figure 5:
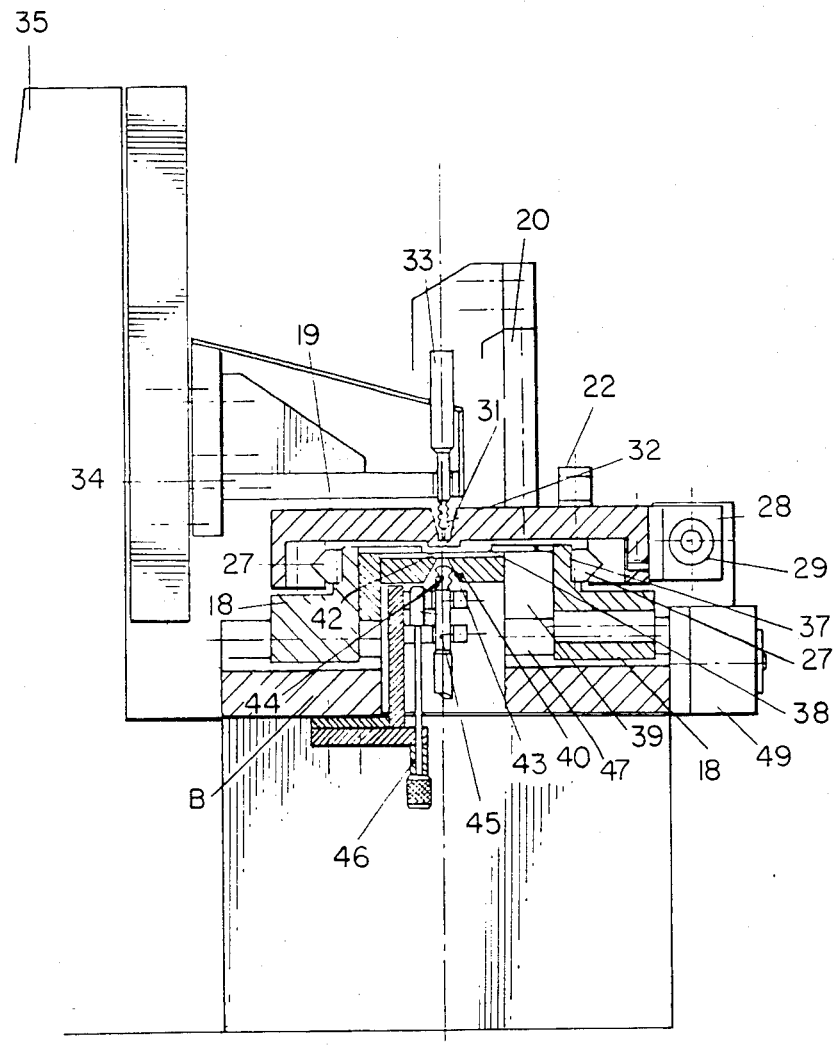
FIG. 5 shows a vertical sectional view taken along line V—V in FIG. 4.
Figure 6:
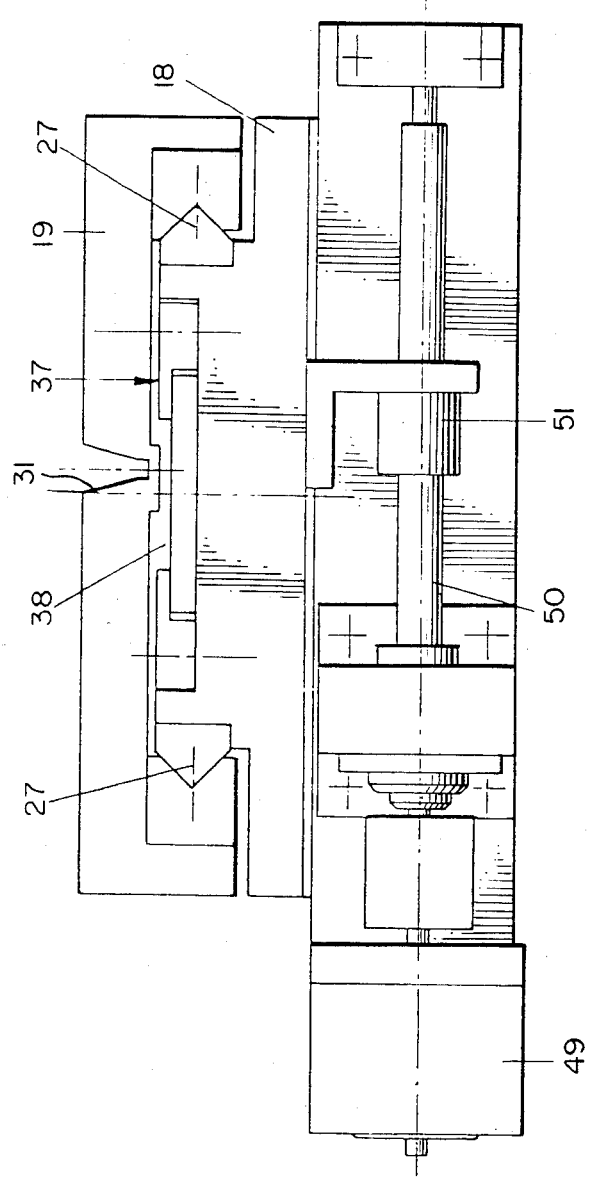
FIG. 6 shows an end view taken from the right in FIG. 3.

Carriage 19 slides along two parallel horizontal guideways 27 fixed to carriage 18 (see FIG. 5 which is a sectional view taken along line V—V in FIG. 4, the carriage 19 being returned to the plane of the section).

The carriage 19 is displaced by intermittent motor means namely a stepper electric motor 28 carried by carriage 18 and driving carriage 19 by a ball screw 29. The travel of carriage 19 is limited at the end adjacent the carrousel ring 3 by two stops 30 and at the opposite end by two other stops 30 fixed to the carriage 18 (FIG. 3).

The carriage 19 comprises on its upper side a groove 31 parallel to the axis of slot 17 and permitting the free movement of the upper probe 32 of the measuring device. The upper probe 32 is mounted for vertical movement on the upper sensing member 33 which in turn is mounted at the end of an arm 34 fixed to a base 35 mounted on the bed of the machine and also supporting a microtesting table.

The upper side of carriage 18 comprises a horizontal plane table 37 level with fixed segment 16 and is also provided with a slot 38 running along its entire length, having the same features as the slot 17 parallel thereto. Carriage 18 has an opening 39 in its middle area permitting the free passage of the support 40 fixed to the support frame B of the machine. At the bottom of slot 38 is an aperture 41 in line with opening 39.

The upper part of support 40 carries a table 42 having horizontal rollers level with the bottom of slot 38, the rollers being at right angles to the axis of the slot 38.

The support 40 has a frustoconical depression 43 for the engagement of the lower probe 44 along the axis of the upper probe 32.

Probe 44 is carried by the lower sensing member 45 which is adjustable in position by means of a set screw 46, the resulting unit being mounted on the support frame B.

Carriage 18 is slidable along two parallel horizontal slides 47 (FIG. 4) at right angles to the slot 38 and carried by a support 48 fixed to the support frame B. The displacement of carriage 18 is effected by a stepper electric motor 49 fixed to the support frame B and rotationally driving a ball screw 50 cooperating with a nut 51 fixed to carriage 18. The travel of carriage 18 is limited by stops 52 fixed to support frame B.

The operation of the machine just described and illustrated follows.

The master gages $C_C$ to be tested and the standard gages $C_R$ with which the master gages are compared, are arranged in pairs comprising one master gage $C_C$ and one standard $C_R$ disposed side by side in rectangular housings 11 in the support plates 10. Each support plate 10 accomodates four gages and the carrousel ring 3 may accomodate, for example, 64 support plates 10 in radial array.

Each pair of gages comprises two identical block gages, though the carrousel ring 3 may accomodate pairs of gages of different dimensions.

The carrousel ring 3 is driven stepwise or according to any sort of programmed order, in rotation so as to bring in succession each support plate 10 into position in front of the slot 17, i.e., the transfer station for transferring the support plate 10 on the ring 3 to the table 37 on carriage 18. Transfer is carried out by means of carriage 19 and arched arm 20 so as to permit the displacement of the gages on the ring during the rotation of the latter.

To bring a support plate 10 in front of the slot 17, the carriage 19 is first driven to the left or counterclockwise as viewed in FIG. 3, several millimeters from the solid line position. This displacement at the end of the stroke causes the roller 25 to move to its retracted position at 25' by means of fixed roller 26 while the push arm 20 moves to its position at 20' bringing the fingers 21 outside the path of lugs 14.

The ring 3 may then rotate freely and bring the desired support plate 10 into position facing fingers 21. Once the support plate 10 is in position, carriage 19 returns to its solid line position in FIG. 3. In this position the support plate 10 is clamped, as it were, between the fingers 21 (respectively on opposite sides of lug 14) contacting shoulder 12 and roller 25 of the rocker arm 22 in resilient engagement with the shoulder 13.

Held between the engagement means the support plate 10 is brought by carriage 19 to the fixed segment or sill 16 then to table 37 in slot 38. The support plate 10 is pushed by push arm 20 and slides, together with its captive gages, along slots 9, 17, and 38 to the table 42 having rollers and is positioned so as to present in succession the various gages along the measuring axis defined by the vertical alignment of probes 32 and 44.

Positioning requires the displacement, by translation, of the support plate 10 along two orthogonal axes and is produced by the carriages 18 and 19.

For measurement of the gage to be tested the upper sensing member 33 is lowered and the probes 32 and 44 are brought into contact with the opposed sides or faces of the gages. The measurements carried out are conventional and comprise, for example, measuring the reference gage $C_R$ at a single middle point, then the gage to be tested $C_C$ at five points (the four corners and the middle).

The measurement device is for example a digital display tester which carries out differential measurements by means of inductive sensing members with pneumatic lift between each measurement to avoid transverse stresses on the probes and wear of the gages in the course of positioning them.

After measuring the different gages the support plate 10 is returned to its place on carrousel ring 3 by means of the carriages 18 and 19 proceeding in the opposite way.

A new measuring cycle is automatically triggered when the support plate 10 is brought back to the transfer station, according to a predetermined program. In fact the automatization and synchronization of the various mechanical movements of a measuring cycle are advantageously produced by a microprocessor which, by means of interfaces and electric control cards specific to each displacement (D.C. motor, stepper motor, electromagnet or electrically operated valve), produces the movements of the various mechanisms in accordance with a programmed cycle.

The microprocessor is associated with a programmable computer storing the various measuring programs and the measurement data.

The software is designed to store the data and provide a complete test report. Nonetheless, the software provides maximum flexibility for the use of the various devices of the machine, for placing in readiness and for changing the measuring cycle.

The machine according to the invention is specifically designed for testing block gages, for example having a nominal length (thickness) between 0.5 and 100 mm.

Finally, the automatic gage measuring machine is obviously not intended to be limited to the illustrated and described embodiment, but on the contrary admits of various modifications and alternatives understood to those skilled in the art, in particular, with respect to the gage support plate transfer means and the positioning at the measuring axis, as well as the configuration and structure of the gage support plates, without departing from the spirit and scope of the present invention.

What is claimed is:

1. An automatic gage measuring machine comprising carrousel means for storing and delivering standard gages and gages to be tested and comprising a flat circular ring mounted for rotational movement on a support frame about a vertical axis, means for intermittently driving said carrousel ring about said vertical axis, a measuring station located inside said carrousel ring and comprising means for measuring the thickness of said gages and comprising two opposed sensing members having probes disposed on the respective sides of the general plane of said carrousel ring and defining a measuring axis, probe displacement means for effecting relative vertical displacement of said probes into contact with opposed sides of a said gage in position along said measuring axis, transfer means for transferring flatwise at least one pair of gages consisting of one of said standard gages and one of said gages to be tested, by horizontal translation substantially in the general plane of said carrousel ring from said carrousel ring to said measuring station and back to said carrousel ring after measuring said pair of gages, positioning means for horizontal translation of said pair of gages in said general plane of said carrousel ring to said measuring axis, means for recording measurements taken by said measuring means and means for controlling and synchronizing movements of said carrousel means, said transfer means, said positioning means and said probe displacement means for sequential measurement of all of said gages to be tested on said carrousel ring.

2. The machine of claim 1, wherein said carrousel ring comprises a plurality of identical radial slots, each of said slots being adapted to receive a gage support plate having at least two housings for receiving a said pair of gages and complementary in dimensions thereto, said transfer means selectively cooperating with said gage support plates for transferring the pair of gages housed thereon from said carrousel ring to said measuring station.

3. The machine of claim 2, wherein said transfer means comprises a first carriage and a second carriage, said first carriage carrying a horizontal plane table, said second carriage also being carried by said first carriage and mounted for movement along a transfer axis from said carrousel ring to said horizontal table, said first carriage being mounted for movement inwardly of said carrousel ring in a direction perpendicular to said transfer axis.

4. The machine according to claim 3, wherein said second carriage comprises a push arm having means for engagement with an end of one of said gage support plates, adjacent the outer periphery of said carrousel ring, a retractable member having means for engagement with the opposite end of said one gage support plate for sliding it along an associated slot on said carrousel ring on and off said horizontal table, and means for temporarily moving said engagement means on said push arm and said retractable member out of the way of said ends of said gage support plates during rotation of said carrousel ring.

5. The machine of claim 3, wherein a fixed segment or sill is disposed between said carrousel ring and said horizontal table on said first carriage and level with said carrousel ring and said horizontal table, a guide slot identical to said slots in said carrousel ring being disposed along said transfer axis from said carrousel ring to said horizontal table.

6. The machine of claim 3, wherein said horizontal table on said first carriage comprises a guide slot parallel to said transfer axis, an opening being provided in the bottom of said guide slot surmounting a fixed table having rollers level with the bottom of said guide slot, said probes being disposed on the respective sides of said guide slot.

7. The machine of claim 6, wherein each one of said gage support plates is selectively carried by said second carriage, then said first carriage onto said table having rollers by sliding movement along said guide slot in said horizontal table.

8. The machine of claim 1, wherein said gage support plates are held in place on said carrousel ring by outer stops on said carrousel ring and a fixed circular guide disposed along the inner periphery of said carrousel ring, said circular guide being cutaway in line with said gage support plate adjacent said transfer means.

9. The machine of claim 1, wherein said means for controlling and synchronizing movement of said carrousel means, said transfer means, said positioning means and said probe displacement means comprise a microprocessor, said microprocessor also controlling said measuring means and said means for recording the measurements.

* * * * *